(12) United States Patent
Wang

(10) Patent No.: US 9,967,532 B2
(45) Date of Patent: May 8, 2018

(54) PROJECTION DEVICE, AND METHOD FOR ADJUSTING A PROJECTED PICTURE

(71) Applicant: HISENSE CO., LTD., Qingdao (CN)

(72) Inventor: Chenxing Wang, Qingdao (CN)

(73) Assignees: HISENSE CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days. days.

(21) Appl. No.: 15/211,826

(22) Filed: Jul. 15, 2016

(65) Prior Publication Data

US 2017/0078630 A1 Mar. 16, 2017

(30) Foreign Application Priority Data

Sep. 15, 2015 (CN) .......................... 2015 1 0585945

(51) Int. Cl.
  *H04N 9/31* (2006.01)
  *H04N 9/12* (2006.01)
(52) U.S. Cl.
  CPC ................. *H04N 9/3185* (2013.01)
(58) Field of Classification Search
  CPC .................................................... H04N 9/3185

USPC ........................................................ 348/745
See application file for complete search history.

(56) References Cited

U.S. PATENT DOCUMENTS

2005/0062939 A1* 3/2005 Tamura ................ H04N 5/7416
  353/69
2014/0340529 A1* 11/2014 Shibata ................ H04N 9/3185
  348/189

FOREIGN PATENT DOCUMENTS

CN   101872108   10/2010
CN   204302651   4/2015

* cited by examiner

*Primary Examiner* — Paulos M Natnael
*Assistant Examiner* — Justin Sanders
(74) *Attorney, Agent, or Firm* — Harness, Dickey & Pierce, P.L.C.

(57) ABSTRACT

The disclosure relates to the field of displaying a projected picture, and particularly to a projection device, and a method for adjusting a projected picture. In an embodiment of the disclosure, the method includes: acquiring an image of a physical screen through a camera, and determining a projection of the physical screen onto a vision plane of the camera; determining rotation parameters and translation parameters of the projection device according to the vision plane and the projection of the physical screen; and adjusting the projection device according to the rotation parameters and the translation parameters of the projection device.

20 Claims, 7 Drawing Sheets

PROJECTION DEVICE, AND METHOD FOR ADJUSTING A PROJECTED PICTURE

CROSS-REFERENCE TO RELATED APPLICATION

This application claims the benefit and priority of Chinese Patent Application No. 201510585945.9 filed Sep. 15, 2015. The entire disclosure of the above application is incorporated herein by reference.

FIELD

The present disclosure relates to the field of displaying a projected picture, and particularly to a projection device, and a method for adjusting a projected picture.

BACKGROUND

This section provides background information related to the present disclosure which is not necessarily prior art.

A projector with an ultra-short focus, with a low projection ratio, and at a short distance from a screen, can project a large picture, but may come with some difficulties with debugging and installation in that if the projector is slightly shift, then the picture may be seriously deformed and displaced, thus making it difficult to align the image projected by the projector with the screen, which may seriously degrade the effect of operating the projector.

In the prior art, the projection device is typically debugged manually very often to determine the optimum projection position, but the projection device may be debugged so difficultly and troublesomely that it may be debugged inefficiently.

In summary, if the projection device is debugged frequently as in the prior art to calibrate the effect of projecting the projected picture onto the screen, then the projection device may be debugged so difficultly and troublesomely that it may be debugged inefficiently.

SUMMARY

This section provides a general summary of the disclosure, and is not a comprehensive disclosure of its full scope or all of its features.

In an aspect, an embodiment of this disclosure provides a projecting device including a memory and a processor, wherein codes are stored in the memory, and the processor executes the codes to perform:

acquiring an image of a physical screen through a camera, and determining a projection of the physical screen onto a vision plane of the camera, wherein the camera is located in a projection lens of the projection device;

determining rotation parameters and translation parameters of the projection device according to the vision plane and the projection of the physical screen; and adjusting the projection device according to the rotation parameters and the translation parameters of the projection device.

In another aspect, an embodiment of this disclosure provides a method for adjusting a projected picture, the method including:

acquiring an image of a physical screen through a camera, and determining a projection of the physical screen onto a vision plane of the camera, wherein the camera is located in a projection lens of the projection device;

determining rotation parameters and translation parameters of the projection device according to the vision plane and the projection of the physical screen; and adjusting the projection device according to the rotation parameters and the translation parameters of the projection device.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

The projection device projects a picture onto a physical screen through the projection lens, but the projection device cannot be operated manually so that the projection device projects precisely the picture to be projected, onto the physical screen to display the projected picture, so the projected picture on the physical screen may be inclined or distorted, and in a method according to an embodiment of the disclosure, the projection device is adjusted manually into a rough range, and then adjusted precisely through the method of the disclosure so that the projection device can project the picture precisely onto the physical screen. With the method of the disclosure, the projection device can be adjusted finely after being manually adjusted roughly, to thereby project the picture more precisely.

In an embodiment of the disclosure, the projection of the physical screen projected on a vision plane of a camera is acquired by the camera, rotation parameters and translation parameters of the projection device are determined according to the vision plane and the projection of the physical screen, and the projection device is adjusted according to the rotation parameters and the translation parameters of the projection device, so that the projection picture projected onto the physical screen can be adjusted simply by rotating and translating the projection device according to the determined rotation parameters and translation parameters of the projection device without debugging manually the projection device frequently, so as to lower the difficulty of debugging the projection device, to improve a debugging effect, and to save resources.

An embodiment of the disclosure will be described below in further details with reference to the drawings of the disclosure.

Figure 1:
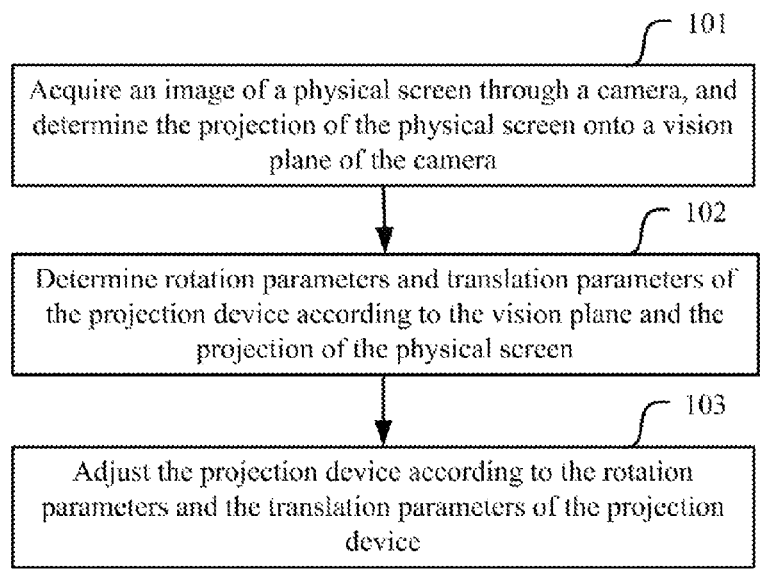
FIG. 1 illustrates a method for adjusting a projected picture according to an embodiment of the disclosure.

As illustrated in FIG. 1, a method for adjusting a projected picture according to an embodiment of the disclosure, to be performed by the projection device, includes the following operations:

The operation 101 is to acquire an image of a physical screen through a camera, and to determine the projection of the physical screen onto a vision plane of the camera;

The operation 102 is to determine rotation parameters and translation parameters of the projection device according to the vision plane and the projection of the physical screen; and The operation 103 is to adjust the projection device according to the rotation parameters and the translation parameters of the projection device.

In the operation 101, the camera is added to the projection device, which can be positioned anywhere on the projection device, e.g., at the top, middle or bottom of the projection device, as long as the camera can take a picture normally.

Optionally the camera is centered in position in the projection lens of the projection device.

Since the rotation parameters and the translation parameters of the projection device need to be calculated taking into account the positional relationship between the projection lens and the camera, if the camera is centered in position in the projection lens of the projection device, then the camera and the projection lens can be considered to be collocated at the same position so that the calculation of the rotation parameters and the translation parameters of the projection device can be significantly facilitated, and resources of the system can be saved.

Figure 2:
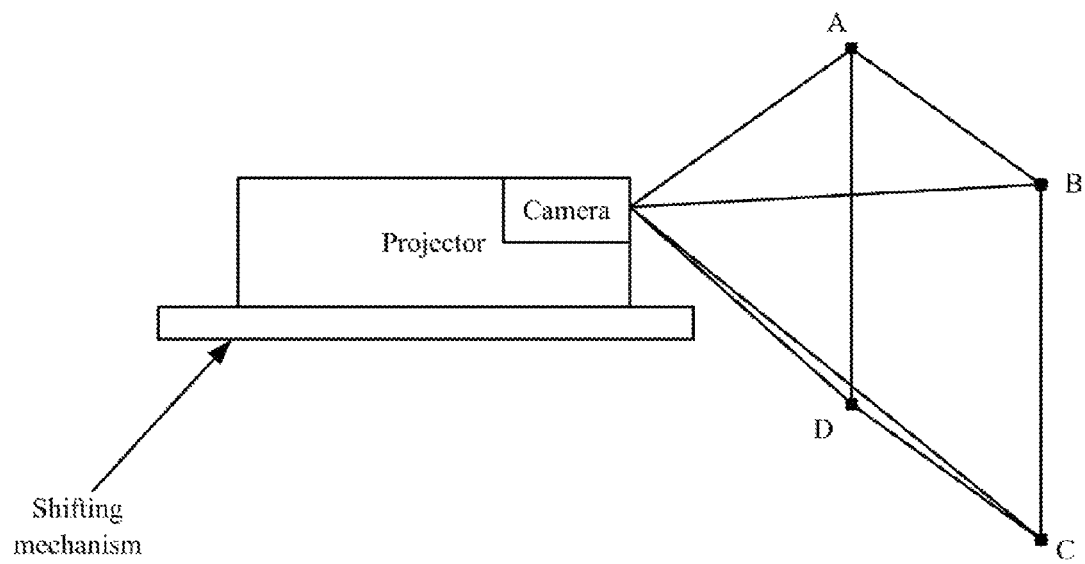
FIG. 2 illustrates a schematic diagram of acquiring information by a camera of the projection device according to an embodiment of the disclosure.

In order for the camera to acquire accurately the information about the physical screen, markers need to be added at four vertexes of the physical screen, and as illustrated in FIG. 2 which is a schematic diagram of acquiring the information by the camera of the projection device according to an embodiment of the disclosure, the camera is centered in position in the project lens, and markers are added respectively at four vertexes of the physical screen ABCD, where small bulbs capable of emitting light can be placed at the markers so that the four markers can emit light by themselves to be acquired by the camera. It shall be noted that the markers can alternatively be omitted in a real implementation, although the markers are added to make it easier to identify the four vertexes of the physical screen ABCD.

It shall be noted in a particular implementation of the operation 101, the camera acquires the image of the physical screen, and determines the vision plane as a result of fitting according to preset parameters, and determines the projection of the physical screen onto the vision plane as a result of fitting, where the vision plane refers to a particular plane perpendicular to an exit light axis of the projection device and at a particular light path distance from the projection lens, and the size of the plane is the same as the physical screen. The vision plane is dependent upon device parameters of the projection device, so given if the projection device is selected, then the vision plane corresponding to the projection device may also be determined. The projection of the physical screen onto the vision plane will be described below in details.

Since the projection device can only be adjusted manually to be calibrated roughly to the physical screen ABCD, but cannot be calibrated precisely, the projection device will be calibrated precisely after being calibrated manually to the physical screen ABCD in the embodiment of the discourse, where after the camera acquires the information about the related parameters, the camera transmits the information about the parameters to a shifting mechanism, which rotates and/or translates the projection device, so that the projection device is calibrated precisely to the physical screen.

Figure 3:
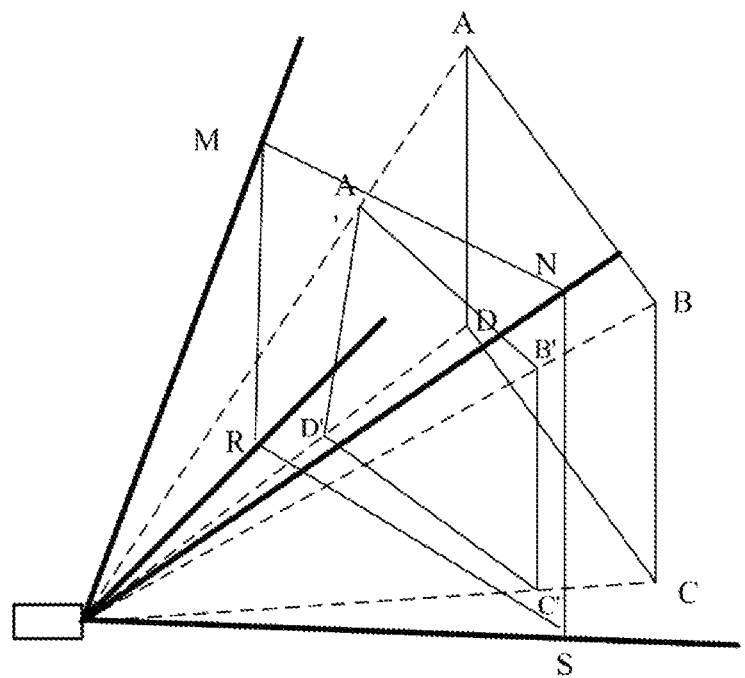
FIG. 3 illustrates a schematic diagram of the projection onto a screen according to an embodiment of the disclosure.
Figure 4:
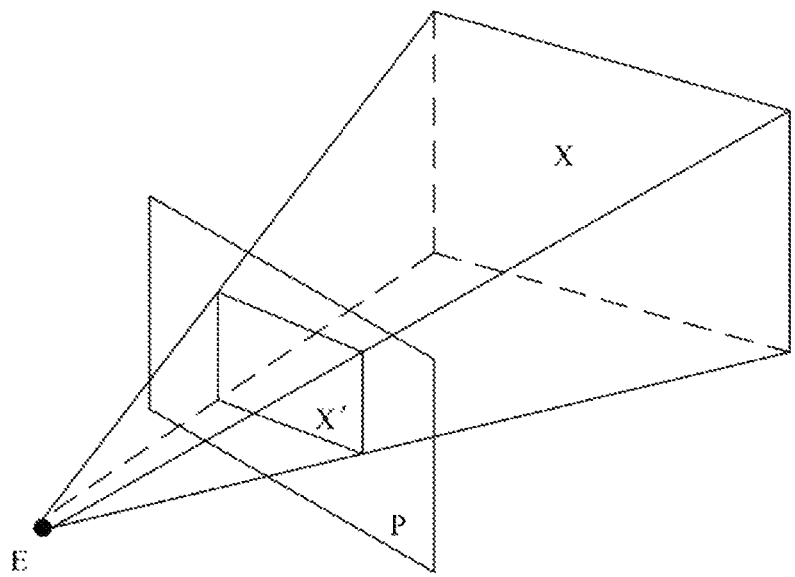
FIG. 4 illustrates a principle diagram of a perspective projection according to an embodiment of the disclosure.

In the operation 102, the rotation parameters and the translation parameters of the projection device are determined according to the vision plane and the projection of the physical screen, where the vision plane is parallel to the plane where the projection lens lies, and four vertexes of the vision plane lie respectively on the plane of the exit light path of the projection lens; and the projection of the physical screen is a perspective projection of the physical screen onto the vision plane. Referring to FIG. 3 which is a schematic diagram of the projection of the physical screen according to an embodiment of the disclosure, the rectangle ABCD in the figure represents the real position of the physical screen, MNSR represents the vision plane, and A'B'C'D' represents the projection of the physical screen ABCD onto the vision plane MNSR; and since A'B'C'D is the perspective projection of the ABCD onto the vision plane MNSR, the vertex A lies on a line extending from A', the vertex B lies on a line extending from B', the vertex C lies on a line extending from C', and the vertex D lies on a line extending from D'. A vision point of the varying perspective projection needs to be defined, and in this context, the vision point of the projection A'B'C'D' is the position of the camera. For the perspective principle, reference can be made to FIG. 4 showing a principle diagram of a perspective projection according to an embodiment of this disclosure, where E represents a vision point, X represents an original image, and X' represents the projection of the original image X onto a vision plane P; and here the original image X can alternatively be a point, a line, a 3D image, etc., the original image can be projected onto the vision plane P as a 2D image, and the size of X' is also limited to the size of the vision plane P.

It shall be noted that throughout the description, the vision plane MNSR refers to a particular plane perpendicular to an exit light axis of the projection device and at a particular light path distance from the projection lens, where the size of the plane is the same as the physical screen.

Referring to FIG. 3, the camera is located in the projection lens, and the camera can take a picture of the physical screen, and further calculate the projection A'B'C'D' of the physical screen ABCD onto the vision plane MNSR, and derive the positional relationship of the projection A'B'C'D on the vision plane MNSR.

It shall be noted that the view-finding central axis of the camera shall coincide with the exit light axis of the projection lens. It shall be noted that the view-finding central axis of the camera can be adjusted by an externally arranged optical component so that the view-finding central axis of the camera coincides in position with the exit light axis of the projection lens on the physical screen.

Since the particular position of the vision plane MNSR is dependent upon the device parameters of the projection device, if the projection device is selected, then the vision plane MNSR corresponding to the projection device may also be determined. In an embodiment of the disclosure, it can be know from the position of the projection A'B'C'D' of the physical screen onto the vision plane MNSR whether the projection device has been aligned with the physical screen ABCD, and further determine the rotation parameters and the translation parameters of the projection device, so that the projection device is adjusted according to the determined rotation parameters and translation parameters. The projection device can be adjusted particularly by transmitting the rotation parameters and the translation parameters to the shifting mechanism illustrated in FIG. 2, and then adjusting the projection device through the shifting mechanism. After the projection device is aligned with the physical screen ABCD, all the vision plane MNSR, the projection A'B'C'D' of the physical screen, and the physical screen ABCD will coincide with each other.

The rotation and translation parameters of the projection device will be determined according to the vision plane MNSR and the projection A'B'C'D' of the physical screen as described below in details.

The method according to the embodiment of the disclosure will be described below in details, where firstly the rotation parameters of the projection device, and then the translation parameters of the projection device are determined in the embodiment of the disclosure, but firstly the translation parameters and then the rotation parameters may be determined as an alternative, and the disclosure will not be limited thereto.

The operation 1 is to determine the rotation parameters of the projection device according to the vision plane and the projection of the physical screen.

The rotation parameters include a rotation angle and a rotation direction.

The rotation parameters of the projection device are determined according to the vision plane and the projection of the physical screen as follows:

The position of the physical screen in a three dimensional Cartesian coordinate system is determined according to the vision plane and the projection of the physical screen; and For a projection plane in the three dimensional Cartesian coordinate system, rotation angles and rotation directions of the projection device around coordinate axes perpendicular to the projection plane are determined according to the projection of the physical screen onto the projection plane, and the projection plane;

Here the projection plane is a plane defined by two coordinate axes in the three dimensional Cartesian coordinate system, where the origin of the three dimensional Cartesian coordinate system is the camera, the X coordinate axis, the Y coordinate axis, and the Z coordinate axis define the three dimensional Cartesian coordinate system, where the Z coordinate axis is the exit light direction of the projection device, and the X coordinate axis, the Y coordinate axis and the Z coordinate axis are perpendicular to each other, the plane defined by the X coordinate axis and the Y coordinate axis is perpendicular to the Z coordinate axis, and the three dimensional Cartesian coordinate system uses the projection device as a reference system.

Here the position of the physical screen in the three dimensional Cartesian coordinate system can be determined according to the vision plane and the projection of the physical screen particularly by determining the position of the physical screen in the three dimensional Cartesian coordinate system according to the positions of the vision plane and the projection of the physical screen in the three dimensional Cartesian coordinate system.

Figure 5:
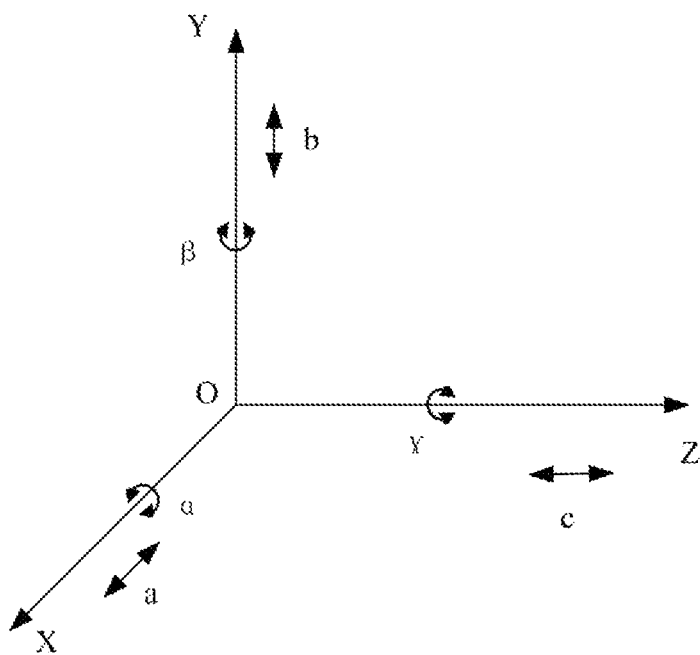
FIG. 5 illustrates an applicable coordinate system according to an embodiment of the disclosure.

For the sake of a convenient analysis and calculation, the three dimensional Cartesian coordinate system is defined in the embodiment of the disclosure as illustrated in FIG. 5 showing the coordinate system applicable to the embodiment of the disclosure, where the X coordinate axis is a horizontal direction referring to the projection device, the Y coordinate axis is a vertical direction referring to the projection device, the Z coordinate axis is the exit light direction of the projection device, and the origin of the three dimensional Cartesian coordinate system is the position of the camera.

Firstly the coordinates of the physical screen ABCD in the three dimensional Cartesian coordinate system are determined according to the coordinates of the vision plane MNSR and the coordinates of the projection A'B'C'D' of the physical screen; and then the rotation parameters of the projection device around the coordinate axes are determined respectively according to the determined positional relationships between the projections of the physical screen ABCD onto three projection planes, and the respective projection planes, where the three projection planes are the YOZ projection plane, the XOZ projection plane, and the XOY projection plane respectively. Particularly the rotation angle and the rotation direction of the projection device around the X coordinate axis are determined according to the physical screen ABCD and the YOZ projection plane; the rotation angle and the rotation direction of the projection device around the Y coordinate axis are determined according to the physical screen ABCD and the XOZ projection plane; and the rotation angle and the rotation direction of the projection device around the Z coordinate axis are determined according to the physical screen ABCD and the XOY projection plane. As illustrated in FIG. 5, $\alpha$ represents the rotation angle of the projection device around the X coordinate axis, $\beta$ represents the rotation angle of the projection device around the Y coordinate axis, and $\gamma$ represents the rotation angle of the projection device around the Z coordinate axis Before particularly how to determine the rotation parameters of the projection device around the respective coordinate axis is described, firstly how to determine the coordinates of the physical screen ABCD according to the coordinates of the vision plane MNSR and the coordinates of the projection A'B'C'D' of the physical screen will be described below.

In the coordinate system, the coordinates of the origin are defined as $O(0,0,0)$, and the coordinates of the four vertexes of the obtained projection of the physical screen are defined as A' $(X'_a, Y'_a, r)$, B' $(X'_b, Y'_b, r)$, C' $(X'_c, Y'_c, r)$, and D' $(X'_d, Y'_d, r)$ respectively, where since the projection A'B'C'D' of the physical screen lies on the vision plane MNSR, the coordinates of the vertexes of the projection A'B'C'D' of the physical screen on the Z coordinate axis are a constant r. Since the four vertexes A, B, C and D of the physical screen lie respectively on the extending lines of OA', OB', OC', and OD', sets of linear equations of OA, OB, OC, and OD can be determined respectively according to OA', OB', OC', and OD' as follows:

$$\begin{cases} X = X'_a{}^* t_a \\ Y = Y'_a{}^* t_a \\ Z = r^* t_a \end{cases} \quad (1)$$

$$\begin{cases} X = X'_b{}^* t_b \\ Y = Y'_b{}^* t_b \\ Z = r^* t_b \end{cases} \quad (2)$$

$$\begin{cases} X = X'_c{}^* t_c \\ Y = Y'_c{}^* t_c \text{, and} \\ Z = r^* t_c \end{cases} \quad (3)$$

$$\begin{cases} X = X'_d{}^* t_d \\ Y = Y'_d{}^* t_d \\ Z = r^* t_d \end{cases} \quad (4)$$

Where $t_a$, $t_b$, $t_c$, $t_d$ represent variables respectively. Since the vision plane MNSR is intended to coincide with the physical screen ABCD, the equations can be solved simultaneously for the coordinates of the four vertexes of the physical screen ABCD in the following equations:

$$\begin{cases} \overline{AB} = \overline{MN} \\ \overline{BC} = \overline{NS} \\ \overline{CD} = \overline{SR} \\ \overline{AD} = \overline{MR} \end{cases} \quad (5)$$

The sets of equations (1) to (4) above can be solved for the expression $\overline{AB}$ of the length of AB, the expression $\overline{BC}$ of the length of BC, the expression $\overline{CD}$ of the length of CD, and the expression $\overline{AD}$ of the length of AD, and in the set of equations (5), all the length $\overline{MN}$ of MN, the length $\overline{NS}$ of NS, the length $\overline{SR}$ of SR, and the length $\overline{MR}$ of MR are known, so the four equations can be solved for the four unknowns $t_a$, $t_b$, $t_c$, $t_d$, so that the coordinates of the physical screen ABCD can be determined by $t_a$, $t_b$, $t_c$, $t_d$, where the coordinates of the four vertexes of the physical screen ABCD are determined respectively as $A(X_a, Y_a, Z_a)$, $B(X_b, Y_b, Z_b)$, $C(X_c, Y_c, Z_c)$, $D(X_d, Y_d, Z_d)$.

As described above, after the coordinates of the physical screen ABCD are determined according to the projection of the physical screen and the vision plane, the rotation angle and the rotation direction of the projection device around the X coordinate axis can be determined according to the physical screen ABCD and the YOZ projection plane; the rotation angle and the rotation direction of the projection device around the Y coordinate axis can be determined according to the physical screen ABCD and the XOZ projection plane; and the rotation angle and the rotation direction of the projection device around the Z coordinate axis can be determined according to the physical screen ABCD and the XOY projection plane.

For the sake of convenient calculation and lower complexity of calculation, in an embodiment of the disclosure, firstly the rotation parameters of the projection device around the X coordinate axis and the Y coordinate axis, and then the rotation parameters of the rotation device around the Z coordinate axis, among the rotation parameters thereof, are determined. The rotation parameters of the projection device can alternatively be determined in other orders without departing from the scope of the disclosure.

The rotation angles and the rotation directions of the projection device around the coordinate axes perpendicular to the projection plane can be determined as follows:

The rotation angle and the rotation direction of the projection device around the X coordinate axis are determined according to the projection of the physical screen onto the YOZ plane and the YOZ plane, and the rotation angle and the rotation direction of the projection device around the Y coordinate axis are determined according to the projection of the physical screen onto the XOZ plane and the XOZ plane; and The rotation angle and the rotation direction of the projection device around the Z coordinate axis are determined according to the rotation angle and the rotation direction of the projection device around the X coordinate axis, the rotation angle and the rotation direction of the projection device around the Y coordinate axis, and the projection of the physical screen onto the XOY plane and the XOY plane.

The rotation angles and the rotation directions of the projection device around the coordinate axes perpendicular to the projection plane are determined above by determining firstly the rotation parameters of the projection device around the X coordinate axis and the Y coordinate axis, and then the rotation parameters of the projection device around the Z coordinate axis, among the rotation parameters thereof, as described below in details respectively.

The operation 11 is to determine the rotation parameters of the projection device around the X coordinate axis and the Y coordinate axis among the rotation parameters thereof.

The rotation angle and the rotation direction of the projection device around the X coordinate axis can be determined as follows:

According to the projection of the physical screen onto the YOZ plane and the YOZ plane, the least one of the angles between the respective sides of the projection of the physical screen onto the YOZ plane, and the respective coordinate axes in the YOZ plane is determined as the rotation angle of the projection device around the X coordinate axis, and the rotation direction of the projection device around the X coordinate axis is determined according to the rotation angle, so that one of the sides of the projection of the physical screen onto the YOZ plane is parallel to one of the axes and perpendicular to the other axis after the projection device is rotated according to the rotation angle and the rotation direction around the X coordinate axis; and The rotation angle and the rotation direction of the projection device around the Y coordinate axis can be determined as follows:

According to the projection of the physical screen onto the XOZ plane and the XOZ plane, the least one of the angles between the respective sides of the projection of the physical screen onto the XOZ plane, and the respective coordinate axes in the XOZ plane is determined as the rotation angle of the projection device around the Y coordinate axis, and the rotation direction of the projection device around the Y coordinate axis is determined according to the rotation angle, so that one of the sides of the projection of the physical screen onto the XOZ plane is parallel to one of the axes and perpendicular to the other axis after the projection device is rotated according to the rotation angle and the rotation direction around the Y coordinate axis.

The rotation angles and the rotation directions of the projection device around the X coordinate axis and the Y coordinate axis can be determined similarly as described above, and they can be determined in any order. The rotation angle and the rotation direction of the projection device around the Y coordinate axis will be determined as described below by way of an example.

Figure 6:
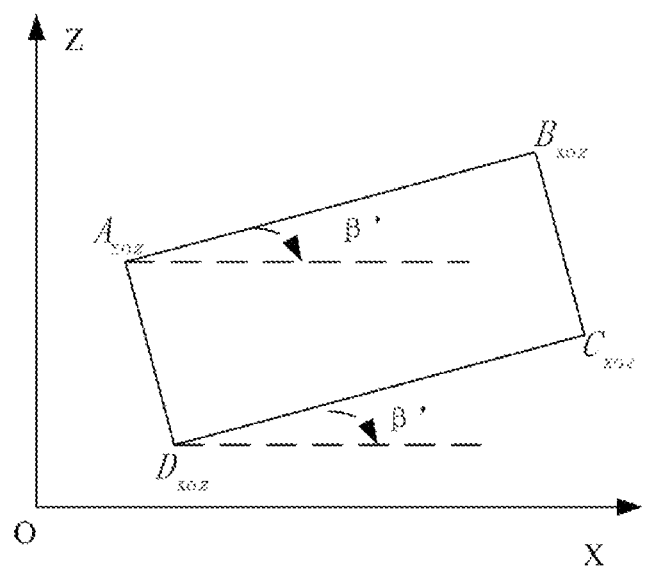
FIG. 6 illustrates a schematic diagram of the projection of a physical screen onto an XOZ projection plane.

As illustrated in FIG. 6 showing a schematic diagram of the projection of the physical screen onto the XOZ projection plane according to an embodiment of the disclosure, XOZ plane represents the projection plane, and the plane $A_{xoz} B_{xoz} C_{xoz} D_{xoz}$ represents the projection of the physical screen ABCD onto the projection plane XOZ, and since the physical screen ABCD is rectangular, the projection of the physical screen ABCD onto the projection plane XOZ is also rectangular as per the parallel projection principle, so that $A_{xoz}B_{xoz}$ is parallel to $C_{xoz}D_{xoz}$, $A_{xoz}D_{xoz}$ is parallel to $B_{xoz}C_{xoz}$, the angle between the side $A_{xoz}B_{xoz}$ of $A_{xoz}B_{xoz}C_{xoz}D_{xoz}$, and the X coordinate axis is $\beta'$, and the angle between the side $A_{xoz}B_{xoz}$ and the Z coordinate axis is $90°-\beta'$; and since $A_{xoz}B_{xoz}C_{xoz}D_{xoz}$ is rectangular, the angle between any one of the sides of $A_{xoz}B_{xoz}C_{xoz}D_{xoz}$ and the X coordinate axis or the Z coordinate axis is $\beta'$ or $90°-\beta'$, so that the projection device will be rotated around the Y coordinate axis simply by the angle $\beta$ which is the less one of $\beta'$ and $90°-\beta'$, that is, $\beta=\min(\beta', 90°-\beta')$. Since all the coordinates of the four vertexes of $A_{xoz}B_{xoz}C_{xoz}D_{xoz}$ are known respectively as $A_{xoz}(X_a, Z_a)$, $B_{xoz}(X_b, Z_b)$, $C_{xoz}(X_c, Z_c)$, and $D_{xoz}(X_d, Z_d)$, $$\beta' = \arctg \frac{Z_b - Z_a}{X_b - X_a} = \arctg \frac{Z_c - Z_d}{X_c - X_d}$$

can be calculated, so that the rotation angle of the projection device around the Y coordinate axis can be determined as $\beta=\min(\beta', 90°-\beta')$.

After the rotation angle is determined, the rotation direction around the Y coordinate axis can be determined according to the rotation angle so that one of the sides of the projection of the physical screen onto the XOZ plane is parallel to one of the axes and perpendicular to the other axis after the projection device is rotated according to the rotation angle and the rotation direction around the Y axis. Referring to FIG. 6, if $\beta'<90°-\beta'$, then the projection $A_{xoz}B_{xoz}C_{xoz}D_{xoz}$ need to be rotated clockwise around the Y coordinate axis by $\beta'$ so that the sides $A_{xoz}B_{xoz}$ and $C_{xoz}D_{xoz}$ of the rotated $A_{xoz}B_{xoz}C_{xoz}D_{xoz}$ are parallel respectively to the X coordinate axis, and the sides $A_{xoz}D_{xoz}$ and $B_{xoz}C_{xoz}$ thereof are parallel respectively to the Z coordinate axis.

In a real application, since the projection device is calibrated precisely in a small range, $\beta$ by which the projection device is rotated around the Y coordinate axis is small, so the system overhead is also small when the projection device is adjusted.

The rotation angle and the rotation direction of the projection device around the Y coordinate axis have been determined as described above in details, and the rotation angle and the rotation direction of the projection device around the X coordinate axis can be determined similarly to the rotation angle and the rotation direction of the projection device around the Y coordinate axis, so a repeated description thereof will be omitted here. The rotation angle $\alpha$ of the projection device around the X coordinate axis can be calculated in the equation of $\alpha=\min(\alpha', 90°=\alpha')$, where $\alpha'$ represents the angle between the side $C_{yoz}D_{yoz}$ of the projection $A_{yoz}B_{yoz}C_{yoz}D_{yoz}$ of the physical screen ABCD onto the projection plane YOZ and the Y coordinate axis, and $\alpha'$ can be calculated in the equation of $$\alpha' = \arctg \frac{Z_b - Z_c}{Y_b - Y_c} = \arctg \frac{Z_d - Z_a}{Y_d - Y_a}.$$

As described above, since the projection device is calibrated precisely in a small range, the least one of the angles between the respective sides of the projection of the physical screen onto the YOZ plane, and the respective coordinate axes in the YOZ plane is determined as the rotation angle of the projection device around the X coordinate axis, and the least one of the angles between the respective sides of the projection of the physical screen onto the XOZ plane, and the respective coordinate axes in the XOZ plane is determined as the rotation angle of the projection device around the Y coordinate axis, where this can be easily done, and the projection device can be less rotated, thus saving the system resources.

The operation 12 is to determine the rotation parameters of the projection device around the Z coordinate axis among the rotation parameters thereof.

The rotation angle and the rotation direction of the projection device around the Z coordinate axis can be determined as follows:

A first target projection of the projection of the physical screen projected onto the XOY plane after the projection device is rotated is determined according to the rotation angle and the rotation direction of the projection device around the X coordinate axis, and the rotation angle and the rotation direction of the projection device around the Y coordinate axis; and According to the first target projection and the XOY plane, the least one of the angles between the respective sides of the first target projection, and the respective coordinate axes in the XOY plane is determined as the rotation angle of the projection device around the Z coordinate axis, and the rotation direction around the Z coordinate axis is determined according to the rotation angle around the Z coordinate axis, so that one of the sides of the projection of the physical screen onto the XOY plane is parallel to one of the axes, and perpendicular to the other axis after the projection device is rotated according to the rotation angle and the rotation direction around the Z coordinate axis.

Figure 7:
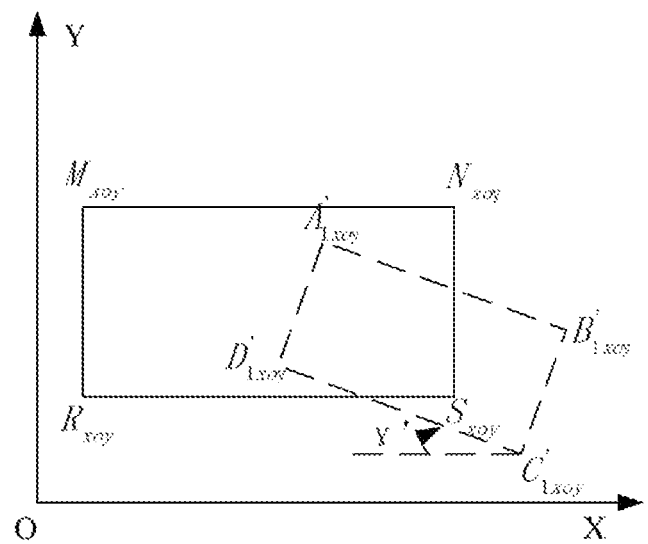
FIG. 7 illustrates a schematic diagram of a first target projection according to an embodiment of the disclosure.

As described above, the rotation parameters of the projection device around the Z coordinate axis among the rotation parameters thereof are further determined after the rotation parameters of the projection device around the X coordinate axis and the Y coordinate axis among the rotation parameters thereof are determined in the operation 11. As illustrated in FIG. 7 showing a schematic diagram of a first target projection according to an embodiment of the disclosure, the first target projection refers to the projection of the projection of the physical screen projected onto the XOY plane after the projection device is rotated according to the rotation angle and the rotation direction of the projection device around the X coordinate axis, and the rotation angle and the rotation direction of the projection device around the Y coordinate axis. As illustrated in FIG. 7, $A'_{1xoy}B'_{1xoy}C'_{1xoy}D'_{1xoy}$ represents the first target projection, and since the projection device is moved so that the three dimensional Cartesian coordinate system is moved, and the relative position of the vision plan in the three dimensional Cartesian coordinate system is fixed, the projection of the vision plane MNSR onto the XOY plane is fixed all the time, i.e., $M_{xoy}N_{xoy}S_{xoy}R_{xoy}$ illustrated in FIG. 7, where any one of the sides of $M_{xoy}N_{xoy}S_{xoy}R_{xoy}$ is parallel or perpendicular to the X coordinate axis.

Since the projection device is calibrated so that the vision plane MNSR coincides with the physical screen ABCD, $M_{xoy}N_{xoy}S_{xoy}R_{xoy}$ should also coincide with $A'_{1xoy}B'_{1xoy}C'_{1xoy}D'_{1xoy}$ in FIG. 7.

Here the rotation angle of the projection device around the Z coordinate axis is determined in such a way that according to the first target projection and the XOY plane, the least one of the angles between the respective sides of the first target projection, and the respective coordinate axes in the XOY plane is determined as the rotation angle of the projection device around the Z coordinate axis, and as illustrated in FIG. 7, if the angle between the side $A'_{1xoy}B'_{1xoy}$ of $A'_{1xoy}B'_{1xoy}C'_{1xoy}D'_{1xoy}$ and the X coordinate angle is $\gamma'$, then since all the coordinates of the respective vertexes of $A'_{1xoy}B'_{1xoy}C'_{1xoy}D'_{1xoy}$ are known as $A'_{1xoy}(X_{A'_{xoy}}, Y_{A'_{xoy}})$, $B'_{1xoy}(X_{B'_{1xoy}}, Y_{B'_{1xoy}})$, $C'_{1xoy}(X_{C'_{1xoy}}, Y_{C'_{1xoy}})$ and $D'_{1xoy}(X_{D'_{1xoy}}, Y_{D'_{1xoy}})$, $$\gamma' = \operatorname{arctg} \frac{Y_{B'_{1xoy}} - Y_{A'_{1xoy}}}{X_{B'_{1xoy}} - X_{A'_{1xoy}}} = \operatorname{arctg} \frac{Y_{C'_{1xoy}} - Y_{D'_{1xoy}}}{X_{C'_{1xoy}} - X_{D'_{1xoy}}}$$

can be calculated, so that the rotation angle of the projection device around the Z coordinate axis can be determined as $\gamma = \min(\gamma', 90° - \gamma')$.

After the rotation angle of the projection device around the Z coordinate axis is determined, the rotation direction around the Z coordinate axis can be determined according to the rotation angle around the Z coordinate axis so that one of the sides of the projection of the physical screen onto the XOY plane is parallel to one of the axes and perpendicular to the other axis after the projection device is rotated according to the rotation angle and the rotation direction around the Z axis. Referring to FIG. 7, if $\gamma' < 90° - \gamma'$, then it may be determined that the projection device is rotated counterclockwise around the Z coordinate axis by $\gamma'$.

Since the Z coordinate axis is the exit light direction, the rotation angle and direction of the projection device around the Z coordinate axis can be determined more easily according to the determined rotation angles and directions of the projection device around the X coordinate axis and the Y coordinate axis in this method, where this can be done easily with low calculation complexity while saving the system resources.

With the method above, the rotation angles and the rotation directions of the projection device around the respective coordinate axes are determined in the operation 1, particularly by determining the rotation angles and the rotation directions of the projection device around the X coordinate axis and the Y coordinate axis in the operation 11, and then the rotation angle and the rotation direction of the projection device around the Z coordinate axis in the operation 12, respectively.

It shall be particularly noted here that the rotation parameters of the projection device around the Z coordinate axis are determined using the projection after the projection device is rotated according to the rotation parameters of the projection device around the X coordinate axis and the Y coordinate axis, i.e., the first target projection, where the projection device need not be rotated in reality, but the rotation parameters of the projection device around the Z coordinate axis need to be calculated using the state after the projection device is rotated around the X coordinate axis and the Y coordinate axis, so the projection device need not be rotated in reality when calculating the rotation parameters of the projection device around the Z coordinate axis. Particularly in an embodiment of the disclosure, the projection device is moved once after all of the rotation parameters and the translation parameters thereof are determined.

After the rotation parameters of the projection device around the respective coordinate axes are determined, the translation parameters of the projection device are determined according to the rotation parameters of the projection device around the respective coordinate axes. Alternatively in a real application, firstly the translation parameters and then the rotation parameters can be determined, and since it is easier to determine firstly the rotation parameters and then the translation parameters because they are calculated with lower complexity, firstly the rotation parameters and then the translation parameters can be determined in the embodiment of the disclosure, but firstly the translation parameters and then the rotation parameters can be determined without departing the scope of the disclosure.

The translation parameters of the projection device will be determined particularly as described below in details.

The operation 2 is to determine the translation parameters of the projection device.

The translation parameters include a translation distance and a translation direction.

The translation parameters of the projection device can be determined as follows:

A second target projection of the projection of the physical screen projected onto the XOY plane after the projection device is rotated according to the rotation parameters of the projection device is determined; and The translation distances and the translation directions of the projection device along the coordinate axes are determined according to the second target projection and the projection of the vision plane onto the XOY plane;

Where the projection plane is a plane defined by two coordinate axes in the three dimensional Cartesian coordinate system, the origin of the three dimensional Cartesian coordinate system is the camera, the Z coordinate axis is the exit light direction of the projection device, the X coordinate axis, the Y coordinate axis, and the Z coordinate axis are perpendicular to each other, and the physical screen is determined by the vision plane and the projection of the physical screen.

Figure 8:
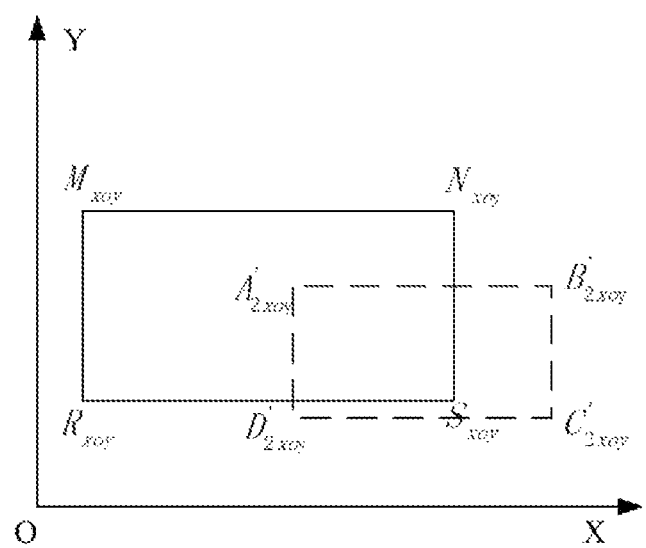
FIG. 8 illustrates a schematic diagram of a relationship between a second target projection, and the projection of a vision plane onto an XOY plane according to an embodiment of the disclosure.

As described above, the second target projection is determined on the XOY projection plane after the projection device is rotated according to the rotation parameters, and then the translation parameters of the projection device are determined according to the positional relationship between the second target projection, and the projection of the target plane (i.e., the vision plane) onto the XOY plane. As illustrated in FIG. 8, $A'_{2xoy}B'_{2xoy}C'_{2xoy}D'_{2xoy}$ represents the second target projection, and $M_{xoy}N_{xoy}S_{xoy}R_{xoy}$ represents the projection of the vision plane MNSR onto the XOY plane. Referring to FIG. 5, the translation parameters to be determined in the operation 2 include the translation distance a and the translation direction of the projection device along the X coordinate axis, the translation distance b and the translation direction of the projection device along the Y coordinate axis, and the translation distance c and the translation direction of the projection device along the Z coordinate axis.

It shall be particularly noted here that the translation parameters of the projection device along the respective coordinate axes are determined using the projection after the projection device is rotated according to the rotation parameters of the projection device around the respective coordinate axes, i.e., the second target projection, where the projection device need not be rotated in reality, but the translation parameters of the projection device along the respective coordinate axes need to be calculated using the state after the projection device is rotated around the respective coordinate axes, so the projection device need not be rotated in reality when calculating the translation parameters of the projection device. Particularly in an embodiment of the disclosure, the projection device is moved once after all of the rotation parameters and the translation parameters thereof are determined.

The translation distances and the translation directions of the projection device along the coordinate axes can be determined as follows:

The translation distance and the translation direction of the projection device along the Z coordinate axis are determined according to the second target projection, and the projection of the vision plane onto the XOY plane; and The translation distances and the translation directions of the projection device along the X coordinate axis and the Y coordinate axis are determined according to the second target projection, the projection of the vision plane onto the XOY plane, and the translation distance and the translation direction of the projection device along the Z coordinate axis.

The translation distances and the translation directions of the projection device along the coordinate axes are determined above by determining firstly the translation distance and the translation direction of the projection device along the Z coordinate axis, and then the translation distances and the translation directions of the projection device along the X coordinate axis and the Y coordinate, as described below in details respectively.

The operation 21 is to determine the translation distance and the translation direction of the projection device along the Z coordinate axis.

The translation distance and the translation direction of the projection device along the Z coordinate axis can be determined as follows:

The ratio of the area of the second target projection to the area of the projection of the vision plane onto the XOY plane is determined; and The translation distance and the translation direction of the projection device along the Z coordinate axis are determined according to the ratio of the areas.

Referring to FIG. 8 showing a schematic diagram of the relationship between the second target projection, and the projection of the vision plane onto the XOY plane, the relationship between the second target projection $A'_{2xoy}B'_{2xoy}C'_{2xoy}D'_{2xoy}$ of the projection of the physical screen projected onto the XOY plane, and the projection $M_{xoy}N_{xoy}S_{xoy}R_{xoy}$ of the vision plane onto the XOY plane can be derived in the operation 1 so that their corresponding sides are parallel to each other, and $A'_{2xoy}B'_{2xoy}C'_{2xoy}D'_{2xoy}$ is similar to $M_{xoy}N_{xoy}S_{xoy}R_{xoy}$. Particularly referring to FIG. 8, $A'_{2xoy}B'_{2xoy}$ is parallel to $M_{xoy}N_{xoy}$, $B'_{2xoy}C'_{2xoy}$ is parallel to, $C'_{2xoy}D'_{2xoy}$ is parallel to $S_{xoy}R_{xoy}$, $A'_{2xoy}D'_{2xoy}$ is parallel to $M_{xoy}R_{xoy}$, and $A'_{2xoy}B'_{2xoy}C'_{2xoy}D'_{2xoy}$ is similar to $M_{xoy}N_{xoy}S_{xoy}R_{xoy}$.

Thus as described above, a factor by which $A'_{2xoy}B'_{2xoy}C'_{2xoy}D'_{2xoy}$ needs be scaled up or down can be determined as a function of the ratio of the area of $A'_{2xoy}B'_{2xoy}C'_{2xoy}D'_{2xoy}$ to the area of $M_{xoy}N_{xoy}S_{xoy}R_{xoy}$ so that the translation distance of the projection device along the Z coordinate axis can be determined in the equation of $$c = \frac{S_{M_{xoy}N_{xoy}S_{xoy}R_{xoy}}}{S_{A'_{2xoy}B'_{2xoy}C'_{2xoy}D'_{2xoy}}} * k,$$

where c represents the translation distance of the projection device along the Z coordinate axis, $S_{M_{xoy}N_{xoy}S_{xoy}R_{xoy}}$ represents the area of $M_{xoy}N_{xoy}S_{xoy}R_{xoy}$, $S_{A'_{2xoy}B'_{2xoy}C'_{2xoy}D'_{2xoy}}$ represents the area of $A'_{2xoy}B'_{2xoy}C'_{2xoy}D'_{2xoy}$ and k represents an adjustment coefficient which is particularly configured to control the translation distance of the projection device along the Z coordinate axis, for example, if the projected picture needs to be adjusted to be slightly larger or smaller than the physical screen in reality, then the translation distance can be controlled by the adjustment coefficient k.

Here the direction in which the projection device is translated along the Z coordinate axis is determined by whether $S_{M_{xoy}N_{xoy}S_{xoy}R_{xoy}}$ is smaller or larger than $S_{A'_{2xoy}B'_{2xoy}C'_{2xoy}D'_{2xoy}}$ so that if $S_{M_{xoy}N_{xoy}S_{xoy}R_{xoy}} < S_{A'_{2xoy}B'_{2xoy}C'_{2xoy}D'_{2xoy}}$, then the projection device may be translated negatively along the Z coordinate axis; otherwise, the projection device may be translated along the positive direction of the Z coordinate axis.

After the projection device is adjusted as described above, referring to FIG. 9 showing a schematic diagram of the projection of the projection of the physical screen projected onto the XOY plane after the projection device is rotated, and translated along the Z coordinate axis, the second target $A'_{2xoy}B'_{2xoy}C'_{2xoy}D'_{2xoy}$ is adjusted to $A'_{3xoy}B'_{3xoy}C'_{3xoy}D'_{3xoy}$ which is the same rectangle as $M_{xoy}N_{xoy}S_{xoy}R_{xoy}$.

In this method, the translation distance and the translation direction of the projection device along the Z coordinate axis can be determined easily according to the ratio of the area of the second target plane to the area of the projection of the vision plane onto the XOY plane while saving the system resources.

The operation 22 is to determine the translation parameters of the projection device along the X coordinate axis and the Y coordinate axis among the translation parameters thereof.

The translation distances and the translation directions of the projection device along the X coordinate axis and the Y coordinate axis can be determined as follows:

The translation distances and the translation directions of the projection device along the X coordinate axis and the Y coordinate axis are determined according to a first target point of the second target projection translated according to the determined translation distance and translation direction along the Z coordinate axis, and a second target point, on the projection of the vision plane onto the XOY plane, corresponding to the second target point;

Here the position of the first target point in the translated second target projection is the same as the position of the second target point in the projection of the second target point onto the XOY plane.

Figure 9:
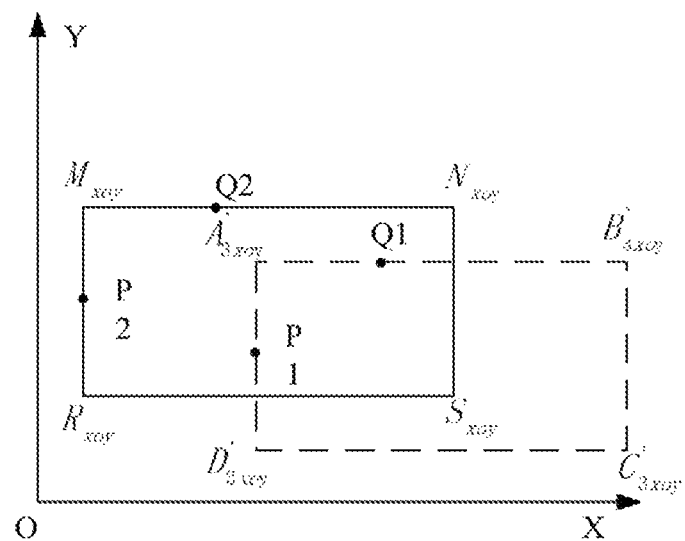
FIG. 9 illustrates a schematic diagram of the projection of the projection of the physical screen projected onto the XOY plane after the projection device is rotated and translated along the Z coordinate axis according to an embodiment of the disclosure.

As described above, referring to FIG. 9, after the projection device is rotated around the respective coordinate axes, and translated along the Z coordinate axis, the projection A' B' C' D' of the physical screen is projected into $A'_{3xoy}B'_{3xoy}C'_{3xoy}D'_{3xoy}$ on the XOY projection plane, and further the projected picture can be calibrated to the physical screen simply by translating the projection device along the X coordinate axis and the Y coordinate axis. Any point on $A'_{3xoy}B'_{3xoy}c'_{3xoy}D'_{3xoy}$ can be selected as a first target point, and then a second target point is selected on $M_{xoy}N_{xoy}S_{xoy}R_{xoy}$, where the position of the first target point in $A'_{3xoy}B'_{3xoy}C'_{3xoy}D'_{3xoy}$ is the same as the position of the second target point in $M_{xoy}N_{xoy}S_{xoy}R_{xoy}$. Referring to FIG. 9, if a first target point P1 is selected at the middle of the side $A'_{3xoy}D'_{3xoy}$ of $A'_{3xoy}B'_{3xoy}C'_{3xoy}D'_{3xoy}$, then a second target point P2 may be selected at the middle of the side $M_{xoy}R_{xoy}$ of $M_{xoy}N_{xoy}S_{xoy}R_{xoy}$; and if a first target point Q1 is selected at the ⅓ length from the endpoint $A'_{3xoy}$ of the side $A'_{3xoy}D'_{3xoy}$ of $A'_{3xoy}B'_{3xoy}C'_{3xoy}D'_{3xoy}$, then a second target point Q2 may be selected at the ⅓ length from the endpoint $M_{xoy}$ of the side $M_{xoy}R_{xoy}$ of $M_{xoy}N_{xoy}S_{xoy}R_{xoy}$.

After the first target point and the second target point are selected, the translation distances and the translation directions of the projection device along the X coordinate axis and the Y coordinate axis can be determined. Referring to FIG. 9, if the first target point is selected as $A'_{3xoy}$, and the second target point is selected as $M_{xoy}$, then the translation distance of the projection device along the X coordinate axis may be determined as $a=|X_{A'_{3xoy}}-X_{M_{xoy}}|$, and the projection device may be translated along the positive direction of the X coordinate axis; and the translation distance of the projection device along the Y coordinate axis may be determined as $b=|Y_{A'_{3xoy}}-Y_{M_{xoy}}|$, and the projection device may be translated along the negative direction of the Y coordinate axis.

Figure 10:
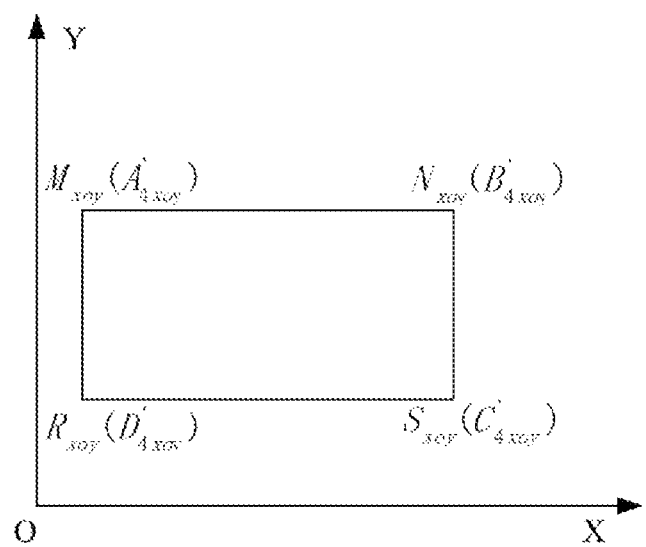
FIG. 10 illustrates a schematic diagram of the projection of the projection of the physical screen projected onto the XOY plane after the projection device is rotated and translated according to an embodiment of the disclosure.

In the operation 103, the rotation parameters and the translation parameters of the projection device can be determined according to the operation 1 and the operation 2 in the operation 102, where the rotation parameter includes the rotation angle and the rotation direction, and the translation parameter includes the translation distance and the translation direction; and after all these parameters are determined, the projection device can be adjusted according to these parameters, where the projection device can be adjusted particularly by a shifting mechanism arranged in the lower portion of the projection device as illustrated in FIG. 2. Referring to FIG. 10 showing a schematic diagram of the projection of the projection of the physical screen projected onto the XOY plane after the projection device is rotated and translated, after the projection device is rotated and translated, the projection $A'_{xoy}B'_{xoy}C'_{xoy}D'_{xoy}$ of the projection of the physical screen projected onto the XOY plane coincides with the projection of the vision plane onto the XOY plane, so the vision plane MSNR also coincides with ABCD.

In the embodiments of the disclosure, the image of the physical screen is acquired by the camera, the projection of the physical screen onto the vision plane of the camera is determined, the rotation parameters and the translation parameters of the projection device are determined according to the vision plane and the projection of the physical screen, and the projection device is adjusted according to the rotation parameters and the translation parameters of the projection device, so that the projection picture projected onto the physical screen can be adjusted simply by rotating and translating the projection device according to the determined rotation parameters and translation parameters of the projection device without debugging manually the projection device frequently, so as to lower the difficulty of debugging the projection device, to improve the debugging effect, and to save the resources.

A method for adjusting a projected picture according to an embodiment of the disclosure will be described below in details.

Figure 11:
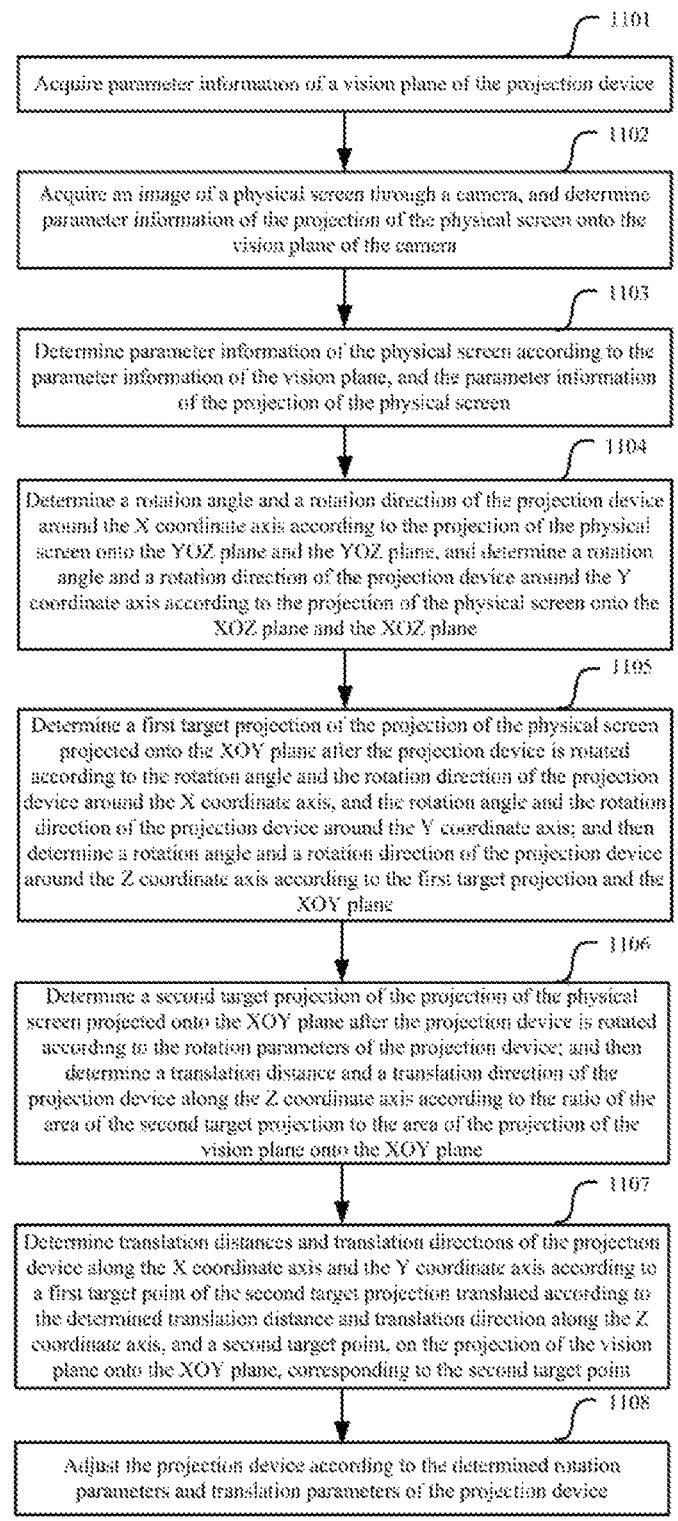
FIG. 11 illustrates a method for adjusting a projected picture according to an embodiment of the disclosure.

FIG. 11 illustrates a method for adjusting a projected picture according to an embodiment of the disclosure.

The operation 1101 is to acquire parameter information of a vision plane of the projection device.

The operation 1102 is to acquire an image of a physical screen through a camera, and to determine parameter information of the projection of the physical screen onto the vision plane of the camera.

The operation 1103 is to determine parameter information of the physical screen according to the parameter information of the vision plane, and the parameter information of the projection of the physical screen.

The operation 1104 is to determine a rotation angle and a rotation direction of the projection device around the X coordinate axis according to the projection of the physical screen onto the YOZ plane and the YOZ plane, and to determine a rotation angle and a rotation direction of the projection device around the Y coordinate axis according to the projection of the physical screen onto the XOZ plane and the XOZ plane.

The operation 1105 is to determine a first target projection of the projection of the physical screen projected onto the XOY plane after the projection device is rotated according to the rotation angle and the rotation direction of the projection device around the X coordinate axis, and the rotation angle and the rotation direction of the projection device around the Y coordinate axis; and to determine a rotation angle and a rotation direction of the projection device around the Z coordinate axis according to the first target projection and the XOY plane.

The operation 1106 is to determine a second target projection of the projection of the physical screen projected onto the XOY plane after the projection device is rotated according to the rotation parameters of the projection device; and to determine a translation distance and a translation direction of the projection device along the Z coordinate axis according to the ratio of the area of the second target projection to the area of the projection of the vision plane onto the XOY plane.

The operation 1107 is to determine translation distances and translation directions of the projection device along the X coordinate axis and the Y coordinate axis according to a first target point of the second target projection translated according to the determined translation distance and translation direction along the Z coordinate axis, and a second target point, on the projection of the vision plane onto the XOY plane, corresponding to the second target point.

The operation 1108 is to adjust the projection device according to the determined rotation parameters and translation parameters of the projection device.

A method for adjusting a projected picture according to an embodiment of the disclosure will be described below in details by way of a particular example.

Figure 12:
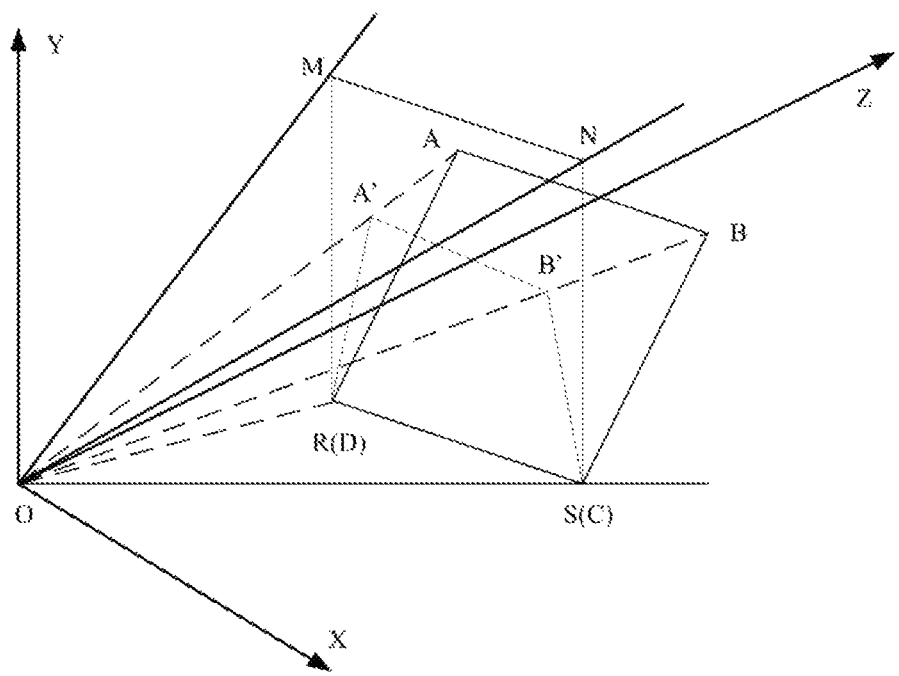
FIG. 12 illustrates a method for adjusting a projected picture according to an embodiment of the disclosure.

Reference is made to FIG. 12 illustrating a schematic diagram of a method for adjusting a projected picture according to an embodiment of the disclosure. For the sake of a convenient description, in the example illustrated in FIG. 12, the projection device is rotated by an angle only around the X coordinate axis, but neither rotated around the Y coordinate axis and the Z coordinate axis, nor translated along the X coordinate axis, the Y coordinate axis, and the Z coordinate axis, where a rotation angle and a rotation direction of the projection device around the X coordinate axis will be determined here.

Here for the sake of a convenient description, the vision plane MNSR is a square with a side length of 2, the Z coordinate axis is the exit light direction of the projection lens, the X coordinate axis is the horizontal direction referring to the camera, the Y coordinate axis is the vertical direction referring to the camera, and the camera is positioned at the coordinate origin O.

If MNSR lies on the plane at Z=1, and the Z coordinate axis passes the center of MNSR, then there will be M(-1, 1,1), N(1,1,1), S(1,-1,1), and R(-1,-1,1); and since there is only deformation which is the rotation around the X coordinate axis, R will coincide with D, and S will coincide with C, so the coordinate values of A ad B will be calculated according to the coordinates of A' and B' acquired by the camera.

If A'(-0.5,0.366,1) and B'(0.5,0.366,1) are acquired by the camera, then since R coincides with D, and S coincides with C, thus C'(1,-1,1) and D'(-1,-1,1), and the equation of OA is derived as $$OA \begin{cases} X = -0.5 \cdot t_a \\ Y = 0.366 \cdot t_a \\ Z = t_a \end{cases},$$

and alike $$OB \begin{cases} X = 0.5 \cdot t_b \\ Y = 0.366 \cdot t_b \\ Z = t_b \end{cases}, OC \begin{cases} X = t_c \\ Y = -t_c \\ Z = t_c \end{cases}, \text{ and } OD \begin{cases} X = -t_d \\ Y = -t_d \\ Z = t_d \end{cases},$$

so the coordinates of the four points A, B, C, and D can be represented by $t_a$, $t_b$, $t_c$, and $t_d$, that is, A(-0.5$t_a$, 0.366$t_a$, $t_a$), B(0.5$t_b$, 0.366$t_b$, $t_b$), C($t_c$, -$t_c$, $t_c$), and D(-$t_d$, -$t_d$, $t_d$), thus resulting in the following set of simultaneous equations:

$$\begin{cases} \overline{AB} = \overline{MN} \\ \overline{CD} = \overline{RS} \\ \overline{AD} = \overline{MR} \\ \overline{BC} = \overline{NS} \end{cases}, \text{ i.e.,}$$

$$\begin{cases} \sqrt{(-0.5t_a - 0.5t_b)^2 + (0.366t_a - 0.366t_b)^2 + (t_a - t_b)^2} = 2 \\ \sqrt{(-t_c - t_d)^2 + (-t_c + t_d)^2 + (t_c - t_d)^2} = 2 \\ \sqrt{(-5t_a - t_d)^2 + (0.366t_a + t_d)^2 + (t_a - t_d)^2} = 2 \\ \sqrt{(0.5t_b + t_c)^2 + (0.366t_b - t_c)^2 + (t_b - t_c)^2} = 2 \end{cases},$$

where the set of equations can be solved for $$\begin{cases} t_a = 2 \\ t_b = 2 \\ t_c = 1 \\ t_d = 1 \end{cases},$$

and A(-1, 0.7321, 2), B(1, 0.7321, 2), C(1, -1, 1), and D(-1, -1, 1), and $$\alpha = \arctg \frac{Z_b - Z_c}{Y_b - Y_c} = \arctg \frac{Z_d - Z_a}{Y_d - Y_a} = \arctg \frac{2-1}{0.7321 + 1} = 30°$$

can be further derived, that is, the picture is rotated by 30° along the X coordinate axis, and further the shifting mechanism can be further controlled to rotate the projection device by 30° in the opposite direction along the X coordinate axis so that the projected picture will be aligned completely with the physical screen.

Figure 13:
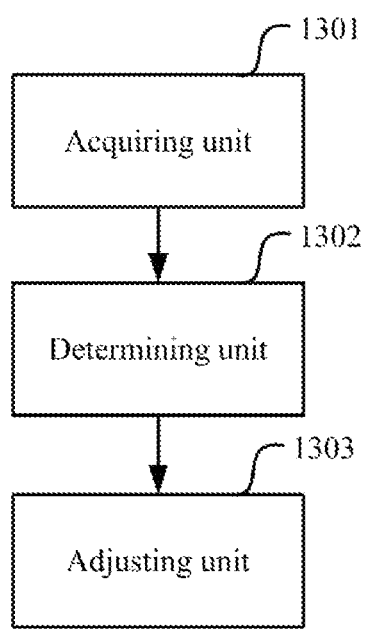
FIG. 13 illustrates a projection device according to an embodiment of the disclosure.

Based upon the same technical idea, an embodiment of the disclosure further provides a projection device which can perform the embodiments of the method as described above. FIG. 13 illustrates a projection device according to an embodiment of the disclosure, which includes.

An acquiring unit 1301 is configured to acquire an image of a physical screen through a camera, and to determine a projection of the physical screen onto a vision plane of the camera, where the camera is located in a projection lens of the projection device;

A determining unit 1302 is configured to determine rotation parameters and translation parameters of the projection device according to the vision plane and the projection of the physical screen; and An adjusting unit 1303 is to adjust the projection device according to the rotation parameters and the translation parameters of the projection device.

Optionally the rotation parameters include a rotation angle and a rotation direction; and The determining unit 1302 is configured:

To determine a position of the physical screen in a three dimensional Cartesian coordinate system according to the vision plane and the projection of the physical screen; and For a projection plane in the three dimensional Cartesian coordinate system, to determine rotation angles and rotation directions of the projection device around coordinate axes perpendicular to the projection plane according to the projection of the physical screen onto the projection plane and the projection plane;

Where the projection plane is a plane defined by two coordinate axes in the three dimensional Cartesian coordinate system, the origin of the three dimensional Cartesian coordinate system is the camera, the Z coordinate axis is the exit light direction of the projection device, and the X coordinate axis, the Y coordinate axis, and the Z coordinate axis are perpendicular to each other.

Optionally the determining unit 1302 is configured:

To determine the rotation angle and the rotation direction of the projection device around the X coordinate axis according to the projection of the physical screen onto the YOZ plane and the YOZ plane; and to determine the rotation angle and the rotation direction of the projection device around the Y coordinate axis according to the projection of the physical screen onto the XOZ plane and the XOZ projection plane; and To determine the rotation angle and the rotation direction of the projection device around the Z coordinate axis according to the rotation angle and the rotation direction of the projection device around the X coordinate axis, the rotation angle and the rotation direction of the projection device around the Y coordinate axis, and the projection of the physical screen onto the XOY plane and the XOY projection plane.

Optionally the determining unit 1302 is configured:

To determine the least one of the angles between the respective sides of the projection of the physical screen onto the YOZ plane, and the respective coordinate axes in the YOZ plane as the rotation angle of the projection device around the X coordinate axis according to the projection of the physical screen onto the YOZ plane and the YOZ plane, and to determine the rotation direction of the projection device around the X coordinate axis according to the rotation angle, so that one of the sides of the projection of the physical screen onto the YOZ plane is parallel to one of the axes and perpendicular to the other axis after the projection device is rotated according to the rotation angle and the rotation direction around the X coordinate axis; and To determine the least one of the angles between the respective sides of the projection of the physical screen onto the XOZ plane, and the respective coordinate axes in the XOZ plane as the rotation angle of the projection device around the Y coordinate axis according to the projection of the physical screen onto the XOZ plane and the XOZ plane, and to determine the rotation direction of the projection device around the Y coordinate axis according to the rotation angle, so that one of the sides of the projection of the physical screen onto the XOZ plane is parallel to one of the axes and perpendicular to the other axis after the projection device is rotated according to the rotation angle and the rotation direction around the Y coordinate axis.

Optionally the determining unit 1302 is configured:

To determine a first target projection of the projection of the physical screen projected onto the XOY plane after the projection device is rotated according to the rotation angle and the rotation direction of the projection device around the X coordinate axis, and the rotation angle and the rotation direction of the projection device around the Y coordinate axis; and To determine the least one of the angles between the respective sides of the first target projection, and the respective coordinate axes in the XOY plane as the rotation angle of the projection device around the Z coordinate axis according to the first target projection and the XOY plane, and to determine the rotation direction around the Z coordinate axis according to the rotation angle around the Z coordinate axis, so that one of the sides of the projection of the physical screen onto the XOY plane is parallel to one of the axes and perpendicular to the other axis after the projection device is rotated according to the rotation angle and the rotation direction around the Z coordinate axis.

Optionally the translation parameters include a translation distance and a translation direction; and The determining unit 1302 is configured:

To determine a second target projection of the projection of the physical screen projected onto the XOY plane after the projection device is rotated according to the rotation parameters of the projection device; and To determine the translation distances and the translation directions of the projection device along the coordinate axes according to the second target projection and the projection of the vision plane onto the XOY plane;

Where the XOY plane is a projection plane in a three dimensional Cartesian coordinate system, the projection plane is a plane defined by two coordinate axes in the three dimensional Cartesian coordinate system, the origin of the three dimensional Cartesian coordinate system is the camera, the Z coordinate axis is the exit light direction of the projection device, the X coordinate axis, the Y coordinate axis, and the Z coordinate axis are perpendicular to each other, and the physical screen is determined by the vision plane and the projection of the physical screen.

Optionally the determining unit 1302 is configured:

To determine the translation distance and the translation direction of the projection device along the Z coordinate axis according to the second target projection and the projection of the vision plane onto the XOY plane; and To determine the translation distances and the translation directions of the projection device along the X coordinate axis and the Y coordinate axis according to the second target projection, the projection of the vision plane onto the XOY plane, and the translation distance and the translation direction of the projection device along the Z coordinate axis.

Optionally the determining unit 1302 is configured:

To determine a ratio of the area of the second target projection to the area of the projection of the vision plane onto the XOY plane; and To determine the translation distance and the translation direction of the projection device along the Z coordinate axis according to the ratio of the areas.

Optionally the determining unit 1302 is configured:

To determine the translation distances and the translation directions of the projection device along the X coordinate axis and the Y coordinate axis according to a first target point of the second target projection translated according to the determined translation distance and translation direction along the Z coordinate axis, and a second target point, on the projection of the vision plane onto the XOY plane, corresponding to the second target point;

Where the position of the first target point in the translated second target projection is the same as the position of the second target point in the projection of the second target point onto the XOY plane.

Optionally the camera is centered in position in the projection lens of the projection device.

An embodiment of the disclosure further provides a projection device including a memory and a processor, where codes are stored in the memory, and the processor executes the codes:

To acquire an image of a physical screen through a camera, and to determine a projection of the physical screen onto a vision plane of the camera, where the camera is located in a projection lens of the projection device;

To determine rotation parameters and translation parameters of the projection device according to the vision plane and the projection of the physical screen; and To adjust the projection device according to the rotation parameters and the translation parameters of the projection device.

Optionally the rotation parameters include a rotation angle and a rotation direction; and The processor executes the codes:

To determine a position of the physical screen in a three dimensional Cartesian coordinate system according to the vision plane and the projection of the physical screen; and For a projection plane in the three dimensional Cartesian coordinate system, to determine rotation angles and rotation directions of the projection device around coordinate axes perpendicular to the projection plane according to the projection of the physical screen onto the projection plane and the projection plane;

Where the projection plane is a plane defined by two coordinate axes in the three dimensional Cartesian coordinate system, the origin of the three dimensional Cartesian coordinate system is the camera, the Z coordinate axis is the exit light direction of the projection device, and the X coordinate axis, the Y coordinate axis, and the Z coordinate axis are perpendicular to each other.

Optionally the processor executes the codes:

To determine the rotation angle and the rotation direction of the projection device around the X coordinate axis according to the projection of the physical screen onto the YOZ plane and the YOZ plane; and to determine the rotation angle and the rotation direction of the projection device around the Y coordinate axis according to the projection of the physical screen onto the XOZ plane and the XOZ projection plane; and To determine the rotation angle and the rotation direction of the projection device around the Z coordinate axis according to the rotation angle and the rotation direction of the projection device around the X coordinate axis, the rotation angle and the rotation direction of the projection device around the Y coordinate axis, and the projection of the physical screen onto the XOY plane and the XOY projection plane.

Optionally the processor executes the codes:

To determine the least one of the angles between the respective sides of the projection of the physical screen onto the YOZ plane, and the respective coordinate axes in the YOZ plane as the rotation angle of the projection device around the X coordinate axis according to the projection of the physical screen onto the YOZ plane and the YOZ plane, and to determine the rotation direction of the projection device around the X coordinate axis according to the rotation angle, so that one of the sides of the projection of the physical screen onto the YOZ plane is parallel to one of the axes and perpendicular to the other axis after the projection device is rotated according to the rotation angle and the rotation direction around the X coordinate axis; and To determine the least one of the angles between the respective sides of the projection of the physical screen onto the XOZ plane, and the respective coordinate axes in the XOZ plane as the rotation angle of the projection device around the Y coordinate axis according to the projection of the physical screen onto the XOZ plane and the XOZ plane, and to determine the rotation direction of the projection device around the Y coordinate axis according to the rotation angle, so that one of the sides of the projection of the physical screen onto the XOZ plane is parallel to one of the axes and perpendicular to the other axis after the projection device is rotated according to the rotation angle and the rotation direction around the Y coordinate axis.

Optionally the processor executes the codes:

To determine a first target projection of the projection of the physical screen projected onto the XOY plane after the projection device is rotated according to the rotation angle and the rotation direction of the projection device around the X coordinate axis, and the rotation angle and the rotation direction of the projection device around the Y coordinate axis; and To determine the least one of the angles between the respective sides of the first target projection, and the respective coordinate axes in the XOY plane as the rotation angle of the projection device around the Z coordinate axis according to the first target projection and the XOY plane, and to determine the rotation direction around the Z coordinate axis according to the rotation angle around the Z coordinate axis, so that one of the sides of the projection of the physical screen onto the XOY plane is parallel to one of the axes and perpendicular to the other axis after the projection device is rotated according to the rotation angle and the rotation direction around the Z coordinate axis.

Optionally the translation parameters include a translation distance and a translation direction; and The processor executes the codes:

To determine a second target projection of the projection of the physical screen projected onto the XOY plane after the projection device is rotated according to the rotation parameters of the projection device; and To determine the translation distances and the translation directions of the projection device along the coordinate axes according to the second target projection, and the projection of the vision plane onto the XOY plane;

Where the XOY plane is a projection plane in a three dimensional Cartesian coordinate system, the projection plane is a plane defined by two coordinate axes in the three dimensional Cartesian coordinate system, the origin of the three dimensional Cartesian coordinate system is the camera, the Z coordinate axis is the exit light direction of the projection device, the X coordinate axis, the Y coordinate axis, and the Z coordinate axis are perpendicular to each other, and the physical screen is determined by the vision plane and the projection of the physical screen.

Optionally the processor executes the codes:

To determine the translation distance and the translation direction of the projection device along the Z coordinate axis according to the second target projection and the projection of the vision plane onto the XOY plane; and To determine the translation distances and the translation directions of the projection device along the X coordinate axis and the Y coordinate axis according to the second target projection, the projection of the vision plane onto the XOY plane, and the translation distance and the translation direction of the projection device along the Z coordinate axis.

Optionally the processor executes the codes:

To determine a ratio of the area of the second target projection to the area of the projection of the vision plane onto the XOY plane; and To determine the translation distance and the translation direction of the projection device along the Z coordinate axis according to the ratio of the areas.

Optionally the processor executes the codes:

To determine the translation distances and the translation directions of the projection device along the X coordinate axis and the Y coordinate axis according to a first target point of the second target projection translated according to the determined translation distance and translation direction along the Z coordinate axis, and a second target point, on the projection of the vision plane onto the XOY plane, corresponding to the second target point;

Where the position of the first target point in the translated second target projection is the same as the position of the second target point in the projection of the second target point onto the XOY plane.

Optionally the camera is centered in position in the projection lens of the projection device.

In the embodiments of the disclosure, the image of the physical screen is acquired by the camera, the projection of the physical screen onto the vision plane of the camera is determined, the rotation parameters and the translation parameters of the projection device are determined according to the vision plane and the projection of the physical screen, and the projection device is adjusted according to the rotation parameters and the translation parameters of the projection device, so that the projection picture projected onto the physical screen can be adjusted simply by rotating and translating the projection device according to the determined rotation parameters and translation parameters of the projection device without debugging manually the projection device frequently, so as to lower the difficulty of debugging the projection device, to improve the debugging effect, and to save the resources. Moreover the vision plane, and the projection of the physical screen onto the vision plane are acquired by the camera, and the positional relationship between the vision plane and the projection of the physical screen is adjusted, so that the projected picture of the projection device can be aligned precisely with the physical screen simply by adjusting the projection device so as to make the vision plane coincide with the projection of the physical screen, the method can be easily performed by the device with lower difficulty while saving the system resources.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A projection device, comprising:
a memory; and
a processor, wherein computer-executable instructions are stored in the memory, and the processor is configured to execute the computer-executable instructions to perform:
acquiring an image of a physical screen through a camera;
determining a projection of the physical screen onto a vision plane of the camera, the vision plane perpendicular to an exit light axis of the projection device, at a predefined light path distance from a projection lens of the projection device, and having a same size as the physical screen;
determining rotation parameters and translation parameters of the projection device according to the vision plane and the projection of the physical screen; and
adjusting the projection device according to the rotation parameters and the translation parameters of the projection device.

2. The projection device according to claim 1, wherein the rotation parameters comprise a rotation angle and a rotation direction; and
the processor is configured to execute the computer-executable instructions to perform:
determining a position of the physical screen in a three dimensional Cartesian coordinate system according to the vision plane and the projection of the physical screen; and
for a projection plane in the three dimensional Cartesian coordinate system, determining rotation angles and rotation directions of the projection device around coordinate axes perpendicular to the projection plane according to the projection of the physical screen onto the projection plane and the projection plane;
wherein the projection plane is a plane defined by two coordinate axes in the three dimensional Cartesian coordinate system, the origin of the three dimensional Cartesian coordinate system is the camera, the Z coordinate axis is the exit light direction of the projection device, and the X coordinate axis, the Y coordinate axis, and the Z coordinate axis are perpendicular to each other.

3. The projection device according to claim 2, wherein the processor is configured to execute the computer-executable instructions to perform:
determining the rotation angle and the rotation direction of the projection device around the X coordinate axis according to the projection of the physical screen onto the YOZ plane and the YOZ plane;
determining the rotation angle and the rotation direction of the projection device around the Y coordinate axis according to the projection of the physical screen onto the XOZ plane and the XOZ projection plane; and
determining the rotation angle and the rotation direction of the projection device around the Z coordinate axis according to the rotation angle and the rotation direction of the projection device around the X coordinate axis, the rotation angle and the rotation direction of the projection device around the Y coordinate axis, and the projection of the physical screen onto the XOY plane and the XOY projection plane.

4. The projection device according to claim 3, wherein the processor is configured to execute the computer-executable instructions to perform:
determining the least one of the angles between the respective sides of the projection of the physical screen onto the YOZ plane, and the respective coordinate axes in the YOZ plane as the rotation angle of the projection device around the X coordinate axis according to the projection of the physical screen onto the YOZ plane and the YOZ plane, and determining the rotation direction of the projection device around the X coordinate axis according to the rotation angle, so that one of the sides of the projection of the physical screen onto the YOZ plane is parallel to one of the axes and perpendicular to the other axis after the projection device is rotated according to the rotation angle and the rotation direction around the X coordinate axis; and determining the least one of the angles between the respective sides of the projection of the physical screen onto the XOZ plane, and the respective coordinate axes in the XOZ plane as the rotation angle of the projection device around the Y coordinate axis according to the projection of the physical screen onto the XOZ plane and the XOZ plane, and determining the rotation direction of the projection device around the Y coordinate axis according to the rotation angle, so that one of the sides of the projection of the physical screen onto the XOZ plane is parallel to one of the axes and perpendicular to the other axis after the projection device is rotated according to the rotation angle and the rotation direction around the Y coordinate axis.

5. The projection device according to claim 3, wherein the processor is configured to execute the computer-executable instructions to perform:

determining a first target projection of the projection of the physical screen projected onto the XOY plane after the projection device is rotated according to the rotation angle and the rotation direction of the projection device around the X coordinate axis, and the rotation angle and the rotation direction of the projection device around the Y coordinate axis; and determining the least one of the angles between the respective sides of the first target projection, and the respective coordinate axes in the XOY plane as the rotation angle of the projection device around the Z coordinate axis according to the first target projection and the XOY plane, and determining the rotation direction around the Z coordinate axis according to the rotation angle around the Z coordinate axis, so that one of the sides of the projection of the physical screen onto the XOY plane is parallel to one of the axes and perpendicular to the other axis after the projection device is rotated according to the rotation angle and the rotation direction around the Z coordinate axis.

6. The projection device according to claim 1, wherein the translation parameters comprise a translation distance and a translation direction; and the processor is configured to execute the computer-executable instructions to perform:

determining a second target projection of the projection of the physical screen projected onto the XOY plane after the projection device is rotated according to the rotation parameters of the projection device; and determining the translation distances and the translation directions of the projection device along the coordinate axes according to the second target projection, and the projection of the vision plane onto the XOY plane;

wherein the XOY plane is a projection plane in a three dimensional Cartesian coordinate system, the projection plane is a plane defined by two coordinate axes in the three dimensional Cartesian coordinate system, the origin of the three dimensional Cartesian coordinate system is the camera, the Z coordinate axis is the exit light direction of the projection device, the X coordinate axis, the Y coordinate axis, and the Z coordinate axis are perpendicular to each other, and the physical screen is determined by the vision plane and the projection of the physical screen.

7. The projection device according to claim 6, wherein the processor is configured to execute the computer-executable instructions to perform:

determining the translation distance and the translation direction of the projection device along the Z coordinate axis according to the second target projection and the projection of the vision plane onto the XOY plane; and determining the translation distances and the translation directions of the projection device along the X coordinate axis and the Y coordinate axis according to the second target projection, the projection of the vision plane onto the XOY plane, and the translation distance and the translation direction of the projection device along the Z coordinate axis.

8. The projection device according to claim 7, wherein the processor is configured to execute the computer-executable instructions to perform:

determining a ratio of the area of the second target projection to the area of the projection of the vision plane onto the XOY plane; and determining the translation distance and the translation direction of the projection device along the Z coordinate axis according to the ratio of the areas.

9. The projection device according to claim 7, wherein the processor is configured to execute the computer-executable instructions to perform:

determining the translation distances and the translation directions of the projection device along the X coordinate axis and the Y coordinate axis according to a first target point of the second target projection translated according to the determined translation distance and translation direction along the Z coordinate axis, and a second target point, on the projection of the vision plane onto the XOY plane, corresponding to the second target point;

wherein the position of the first target point in the translated second target projection is the same as the position of the second target point in the projection of the second target point onto the XOY plane.

10. The projection device according to claim 1, wherein the camera is located in the projection lens of the projection device.

11. A method for adjusting a projected picture, the method comprising:

acquiring an image of a physical screen through a camera;

determining a projection of the physical screen onto a vision plane of the camera, the vision plane perpendicular to an exit light axis of the projection device, at a predefined light path distance from a projection lens of the projection device, and having a same size as the physical screen;

determining rotation parameters and translation parameters of the projection device according to the vision plane and the projection of the physical screen; and adjusting the projection device according to the rotation parameters and the translation parameters of the projection device.

12. The method according to claim 11, wherein the rotation parameters comprise a rotation angle and a rotation direction; and determining the rotation parameters of the projection device according to the vision plane and the projection of the physical screen comprises:

determining a position of the physical screen in a three dimensional Cartesian coordinate system according to the vision plane and the projection of the physical screen; and for a projection plane in the three dimensional Cartesian coordinate system, determining rotation angles and rotation directions of the projection device around coordinate axes perpendicular to the projection plane according to the projection of the physical screen onto the projection plane and the projection plane;

wherein the projection plane is a plane defined by two coordinate axes in the three dimensional Cartesian coordinate system, the origin of the three dimensional Cartesian coordinate system is the camera, the Z coordinate axis is the exit light direction of the projection device, and the X coordinate axis, the Y coordinate axis, and the Z coordinate axis are perpendicular to each other.

13. The method according to claim 12, wherein determining the rotation angles and the rotation directions of the projection device around the coordinate axes perpendicular to the projection plane comprises:

determining the rotation angle and the rotation direction of the projection device around the X coordinate axis according to the projection of the physical screen onto the YOZ plane and the YOZ plane; and determining the rotation angle and the rotation direction of the projection device around the Y coordinate axis according to the projection of the physical screen onto the XOZ plane and the XOZ projection plane; and determining the rotation angle and the rotation direction of the projection device around the Z coordinate axis according to the rotation angle and the rotation direction of the projection device around the X coordinate axis, the rotation angle and the rotation direction of the projection device around the Y coordinate axis, and the projection of the physical screen onto the XOY plane and the XOY projection plane.

14. The method according to claim 13, wherein determining the rotation angle and the rotation direction of the projection device around the X coordinate axis comprises:

determining the least one of the angles between the respective sides of the projection of the physical screen onto the YOZ plane, and the respective coordinate axes in the YOZ plane as the rotation angle of the projection device around the X coordinate axis according to the projection of the physical screen onto the YOZ plane and the YOZ plane, and determining the rotation direction of the projection device around the X coordinate axis according to the rotation angle, so that one of the sides of the projection of the physical screen onto the YOZ plane is parallel to one of the axes and perpendicular to the other axis after the projection device is rotated according to the rotation angle and the rotation direction around the X coordinate axis; and determining the rotation angle and the rotation direction of the projection device around the Y coordinate axis comprises:

determining the least one of the angles between the respective sides of the projection of the physical screen onto the XOZ plane, and the respective coordinate axes in the XOZ plane as the rotation angle of the projection device around the Y coordinate axis according to the projection of the physical screen onto the XOZ plane and the XOZ plane, and determining the rotation direction of the projection device around the Y coordinate axis according to the rotation angle, so that one of the sides of the projection of the physical screen onto the XOZ plane is parallel to one of the axes and perpendicular to the other axis after the projection device is rotated according to the rotation angle and the rotation direction around the Y coordinate axis.

15. The method according to claim 13, wherein determining the rotation angle and the rotation direction of the projection device around the Z coordinate axis comprises:

determining a first target projection of the projection of the physical screen projected onto the XOY plane after the projection device is rotated according to the rotation angle and the rotation direction of the projection device around the X coordinate axis, and the rotation angle and the rotation direction of the projection device around the Y coordinate axis; and determining the least one of the angles between the respective sides of the first target projection, and the respective coordinate axes in the XOY plane as the rotation angle of the projection device around the Z coordinate axis according to the first target projection and the XOY plane, and determining the rotation direction around the Z coordinate axis according to the rotation angle around the Z coordinate axis, so that one of the sides of the projection of the physical screen onto the XOY plane is parallel to one of the axes and perpendicular to the other axis after the projection device is rotated according to the rotation angle and the rotation direction around the Z coordinate axis.

16. The method according to claim 11, wherein the translation parameters comprise a translation distance and a translation direction; and determining the translation parameters of the projection device comprises:

determining a second target projection of the projection of the physical screen projected onto the XOY plane after the projection device is rotated according to the rotation parameters of the projection device; and determining the translation distances and the translation directions of the projection device along the coordinate axes according to the second target projection and the projection of the vision plane onto the XOY plane;

wherein the XOY plane is a projection plane in a three dimensional Cartesian coordinate system, the projection plane is a plane defined by two coordinate axes in the three dimensional Cartesian coordinate system, the origin of the three dimensional Cartesian coordinate system is the camera, the Z coordinate axis is the exit light direction of the projection device, the X coordinate axis, the Y coordinate axis, and the Z coordinate axis are perpendicular to each other, and the physical screen is determined by the vision plane and the projection of the physical screen.

17. The method according to claim 16, wherein determining the translation distances and the translation directions of the projection device along the coordinate axes comprises:

determining the translation distance and the translation direction of the projection device along the Z coordinate axis according to the second target projection and the projection of the vision plane onto the XOY plane; and determining the translation distances and the translation directions of the projection device along the X coordinate axis and the Y coordinate axis according to the second target projection, the projection of the vision plane onto the XOY plane, and the translation distance and the translation direction of the projection device along the Z coordinate axis.

18. The method according to claim 17, wherein determining the translation distance and the translation direction of the projection device along the Z coordinate axis comprises:

determining a ratio of the area of the second target projection to the area of the projection of the vision plane onto the XOY plane; and determining the translation distance and the translation direction of the projection device along the Z coordinate axis according to the ratio of the areas.

19. The method according to claim 17, wherein determining the translation distances and the translation directions of the projection device along the X coordinate axis and the Y coordinate axis comprises:

determining the translation distances and the translation directions of the projection device along the X coordinate axis and the Y coordinate axis according to a first target point of the second target projection translated according to the determined translation distance and translation direction along the Z coordinate axis, and a second target point, on the projection of the vision plane onto the XOY plane, corresponding to the second target point;

wherein the position of the first target point in the translated second target projection is the same as the position of the second target point in the projection of the second target point onto the XOY plane.

20. The method according to claim 11, wherein the camera is located in the projection lens of the projection device.

* * * * *